United States Patent [19]

Miyata et al.

[11] Patent Number: 4,731,417
[45] Date of Patent: Mar. 15, 1988

[54] MULTICOMPONENT RESIN COMPOSITION VARIABLE IN LIGHT TRANSMITTANCE WITH TEMPERATURE

[75] Inventors: Seizo Miyata; Satoru Kobayashi, both of Tokyo, Japan

[73] Assignee: Central Glass Company, Limited, Ube, Japan

[21] Appl. No.: 837,304

[22] Filed: Mar. 7, 1986

[30] Foreign Application Priority Data

Mar. 7, 1985 [JP] Japan ..................... 60-43724

[51] Int. Cl.$^4$ .............. C08L 27/16; C08L 31/04; C08L 33/08
[52] U.S. Cl. ..................... 525/200; 525/146; 525/185; 525/199; 525/206; 525/214; 525/227; 525/229; 525/230; 525/231; 525/238; 525/241
[58] Field of Search ............. 525/199, 200, 185, 146, 525/206, 214, 227, 229, 230, 231, 238, 241

[56] References Cited

U.S. PATENT DOCUMENTS

| | | | |
|---|---|---|---|
| 3,342,778 | 9/1967 | Anderson | 525/200 |
| 4,319,002 | 3/1982 | Witschard | 525/71 |
| 4,546,149 | 10/1985 | Kidoh et al. | 525/199 |

FOREIGN PATENT DOCUMENTS 216340 6/1985 Japan .................... 525/200

OTHER PUBLICATIONS

Akiyama et al., "Polymer Blend," pp. 4–14, 1981.

*Primary Examiner*—Jacob Ziegler
*Attorney, Agent, or Firm*—Fleit, Jacobson, Cohn & Price

[57] ABSTRACT

Disclosed is a multicomponent resin composition which is essentially a blend of three polymers, each of which may be a copolymer, and undergoes a change in light transmittance and color with temperature. The first and second polymers are chosen in combination such that a blend thereof exhibits a phase diagram in which a lower critical solution temperature appears, and the third polymer is one which has mutual solubility, at least partially, with either or both of the first and second polymers. For example, polymethyl methacrylate and a copolymer of vinylidene fluoride and hexafluoroacetone, as the first and second polymers, and polyvinyl acetate are blended together. The phase separation temperature or coloring temperature of the multicomponent resin composition depends on the amount of the third polymer, and opacifying and coloring of the resin composition caused by heating become irreversible by cooling when the amount of the third polymer is sufficient. The multicomponent resin composition is useful as a thermal-mode information storage material and also as a light shield material.

13 Claims, 6 Drawing Figures

MULTICOMPONENT RESIN COMPOSITION VARIABLE IN LIGHT TRANSMITTANCE WITH TEMPERATURE

BACKGROUND OF THE INVENTION

This invention relates to a multicomponent resin composition which undergoes a change in light transmittance with temperature. The resin composition is a blend of at least three kinds of polymers including a combination of two polymers which have mutual solubility and a blend of which exhibits a phase diagram in which a lower critical solution temperature appears.

The recent advancement of optoelectronics is remarkable. It is unquestionable that the role of optoelectronics in the information-oriented society will acquire further growing importance as represented by the rapidly increasing applications of optical fiber communication systems In utilizing optoelectronics in the information industry an important task is developing suitable materials for information storage. With the rapid development of practical applications of lasers, recently much attention is focused on the so-called thermal-mode storage materials in which thermally written information is stored by a change in a certain physical characteristic of the storage material such as light transmittance or color. As to the form of storage media, optical disc memories are dominant. Current optical disc memories are generally constructed of a glass or plastic substrate and a coating film which is principally formed of an intermetallic compound that undergoes a thermally induced change in its certain optical characteristic such as transmittance, reflectance or refractive index.

In view of the flexibility of organic polymeric materials in various aspects, and particularly in processability, as well as economical advantages of such materials, it is desirable that organic polymeric materials functional as information storage materials should be developed. Until now applications of organic materials to information storage materials for optical memories are limited to auxiliary materials represented by binders some of which include a dye absorbent of laser light. Although some of known organic polymers undergo changes in their certain physical characteristics such as density and refractive index when heated beyond the glass transition temperature or melting point, such polymers do not serve as practical thermal-mode storage materials.

SUMMARY OF THE INVENTION

It is an object of the present invention to provide an organic polymeric material which undergoes a great change in light transmittance or color with temperature and is useful as a thermal-mode information storage material or as a light shield material.

The present invention provides a blended multicomponent resin composition comprising a combination of first and second polymers which have mutual solubility and a blend of which exhibits a phase diagram in which a lower critical solution temperature appears, and a third polymer which has mutual solubility, at least partially, with at least one of the first and second polymers and serves the function of controlling the phase separation temperature of the multicomponent resin composition.

The start of this invention was giving keen attention to the phenomena relating to mutual solubility and phase separation in some blends of organic polymers. Particularly attention was focused on one type of binary polymer blend systems characterized by exhibiting a phase diagram in which a lower critical solution temperature (LCST) appears. At relatively low temperatures a LCST-type binary polymer blend maintains mutual solubility and accordingly remains transparent. However, at elevated temperatures the same blend undergoes phase separation and accordingly becomes opaque. In other words, such a blend has a tendency to exhibit a great change in its light transmittance by the influence of thermal energy. However, LCST-type binary blends of conventional polymers are not attractive as information storage materials because of some reasons such as being too high in the transition temperature and being difficult to maintain in a desirably colored state. The present invention has been reached by discovering that such inconveniences of a LCST-type binary polymer blend can be obviated by adding another polymer which has mutual solubility, or partial mutual solubility, with at least one component of the LCST-type binary blend.

Fundamentally, a resin composition according to the invention is a blended three-component resin composition in which each component is an organic homopolymer or copolymer. The first and second components are selected so as to provide a LCST-type blend, and preferably so as to provide a normally transparent blend. For example, a combination of a vinylidene fluoride base copolymer and an acrylic or methacrylic ester polymer is very suitable. A blend of these two kinds of polymers gives, for example, a sheet which is colorless and transparent at room temperature. When heated up to a given temperature the sheet almost suddenly loses transparency by reason of phase separation of the polymer blend and colors in blue, and at a slightly higher temperature the blue color changes to white. By cooling such changes are reversible. According to the invention, the two-component blend is further blended with a suitable polymer such as a polyvinyl ester. When the resultant three-component blend is heated, the bluing phenomenon begins at a lower temperature than in the case of the two-component blend and lasts over a certain range of temperature until the final change in color from blue to white. That is, in the case of heating the three-component blend a transitional region is clearly recognizable between the mutual soluble and transparent region and the phase-separated opaque region. Furthermore, the temperature at which the coloring in blue begins can arbitrarily be controlled by varying the amount of the third component of the blend. Still further, it is possible to render the transition from the mutually soluble state to the phase-separated state irreversible by cooling, and accordingly it is possible to fix the blue or white color of the once heated blend even at room temperature by using the third component in a sufficient amount.

By virtue of the above described features, a multicomponent resin composition according to the invention is useful as a thermal-mode information storage material and will acquire importance in the field of optoelectronics. Writing of information in a recording medium using this resin composition can be done with a relatively low heat energy. In our optical recording experiments using a Nd:YAG laser, discs formed of this resin composition exhibited clear coloring in the manner of tiny spots. This resin composition is useful also as a light shield material. For example, applications of the multicomponent resin compositions according to the invention will be found in optical disc memories, light switches, light shield films, temperature sensors and self-regulating heat insulating or retaining materials.

A resin composition according to the invention may be comprised of more than three components. In such a case, the component(s) additional to the above described essential three components should also be selected from polymers having mutual solubility, or partial mutual solubility, with at least one of the above described first and second components.

DESCRIPTION OF THE PREFERRED EMBODIMENTS

Figure 1:
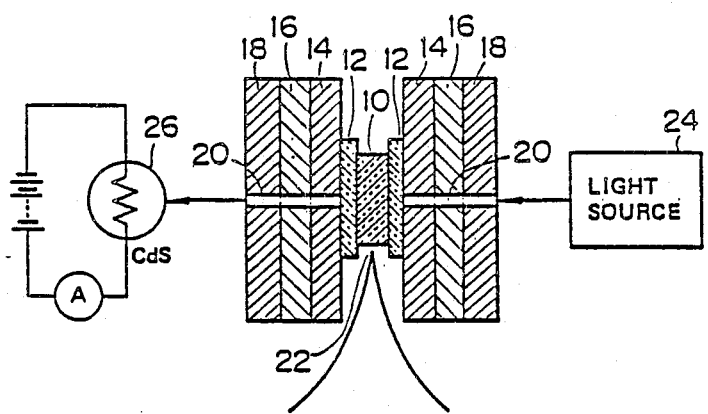
FIG. 1 is a schematic illustration of a light transmittance measuring apparatus.

For a blended multicomponent resin composition according to the invention the first and second components, each of which is a polymer or copolymer, must be chosen such that a blend of these two kinds of polymers has mutual solubility and exhibits a LCST-type phase diagram. Furthermore, it is desirable that the same blend should be transparent or semitransparent when formed into a desirably shaped member.

A suitable combination of two kinds of polymers as the first and second components can be selected from the following combinations: polyvinyl chloride and a polyalkyl acrylate, a polyalkyl methacrylate and chlorinated polyethylene, a polyalkyl acrylate and a vinylidene fluoride base copolymer, a polyalkyl methacrylate and a vinylidene fluoride base copolymer, polyvinyl methyl ketone and a vinylidene fluoride base copolymer, polystyrene and a polyalkyl vinyl ether, polycarbonate and polycaprolactone, an ethylenevinyl acetate copolymer and a chlorinated rubber, and a polyalkyl acrylate and polyvinyl nitrate.

In the combinations using either a polyalkyl acrylate or a polyalkyl methacrylate, the alkyl acrylate or methacrylate can be selected from n-alkyl esters of acrylic or methacrylic acid, such as methyl, ethyl, n-propyl, n-butyl, n-amyl, n-hexyl, n-peptyl, n-octyl, n-nonyl, n-decyl, n-dodecyl, n-tetradecyl, n-hexadecyl and n-stearyl acrylates or methacrylates and also from isopropyl, isobutyl, t-butyl and hydroxyethyl acrylates or methacrylates. The polyalkyl acrylate or methacrylate is not necessarily a homopolymer and may be a copolymer of acrylates or methacrylates selected from the above named ones. It is also possible to employ a polymer of a different kind of acrylate or methacrylate such as cyclohexyl acrylate or methacrylate, glycidyl acrylate or methacrylate, allyl acrylate or methacrylate or benzyl acrylate or methacrylate in place of a polyalkyl acrylate or methacrylate. Furthermore, it is possible to use a copolymer of an acrylate or methacrylate with a commonplace comonomer such as, for example, styrene or acrylonitrile.

In the combinations using a vinylidene fluoride (VDF) base copolymer, the copolymer can be selected from VDF-trifluoroethylene copolymers, VDF-tetrafluoroethylene copolymers, VDF-hexafluoroisobutene copolymers, VDF-hexafluoroacetone copolymers, VDF-chlorotrifluoroethylene copolymers, VDF-vinyl fluoride copolymers, VDF-hexafluoropropene copolymers and VDF-trifluoroethylene-vinyl fluoide copolymers.

In a multicomponent resin composition according to the invention the third or controlling component is a polymer or copolymer which has mutual solubility or partial mutual solubility with at least one of the above described first and second components. As the third component it is preferred to use a polymer of a vinyl ester, which may be either an aliphatic compound such as vinyl acetate, vinyl propionate, vinyl butyrate, vinyl caproate, vinyl caprylate, vinyl caprate, vinyl laurate or vinyl stearate or an aromatic comound such as vinyl benzoate. In some cases it is also possible to use polystyrene or a copolymer of styrene with acrylonitrile.

It is preferable that the refractive index of the selected third component is nearly equal to the refractive index of the blend of the first and second components and, therefore, falls in the range from about 1.35 to about 1.6.

In a multicomponent resin composition according to the invention the amount of the third component is variable over a very wide range, which is from 0.1 to 90 wt % of the entire resin composition, and preferably in the range from 1 to 80 wt % of the entire resin composition. At mentioned hereinbefore, it is permissible that the multicomponent resin composition further comprises at least one polymer each of which serves as an additional controlling component in combination with the third component. In such a case the total amount of the controlling components including the above described third component is variable over the range from 0.1 to 90 wt %, and preferably from 1 to 80 wt %, of the entire resin composition. If desired a plasticizer may be added to a resin composition according to the invention.

A multicomponent resin composition according to the invention can be prepared by any of known blending methods for preparing conventional thermoplastic resin compositions. That is, blending of all the components can be accomplished by a powder blending method, a melt blending method or a mixed solution method using a solvent common to all the components. The blended resin composition is thermoplastic and can be formed into a desired shape such as a film or sheet by extrusion or molding. A preferred method for producing a film or sheet which is high in transparency is a solution casting method in which a solution of the blended resin composition, or all the components of the resin composition, in an organic solvent common to all the components is applied onto a suitable surface to thereby obtain a cast-film.

The invention will further be illustrated by the following nonlimitative examples.

EXAMPLE 1

Polymethyl methacrylate (PMMA) and a copolymer of 91 mol% of vinylidene fluoride (VDF) and 9 mol% of hexafluoroacetone (HFA) were chosen as the first and second components which are required to have mutual solubility. A blend of PMMA with a VDF-HFA copolymer, referred to as P(VDF-HFA), exhibits a LCST-type phase diagram and is rapid in its transition from a phase-separated state to a mutually soluble state. As the third component, polyvinyl acetate (PVAc) was employed.

Blending of these three components was performed by dissolving the three kinds of polymers togehter in methyl ethyl ketone and well stirring the resultant solution. The amount of the third component was varied to prepare seven kinds of blend samples in which the P(VDF-HFA):PMMA:PVAc proportions were 1:3:0.1, 1:3:0.5, 1:3:1, 1:3:2, 1:3:4, 1:3:8 and 1:3:16 by weight, respectively. From each of the seven kinds of mixed solutions a cast-film having a thickness of about 100 μm was formed by a usual solution coating method using a glass substrate.

At various temperatures ranging from about 150° C. about 280° C., light transmittance of each blend in the cast-film form was measured by using the apparatus shown in FIG. 1. Each film sample 10 was sandwiched between two sheets of transparent glass 12, and a copper plate 14 was placed on the outer side of each glass sheet 12. A plate heater 16 was placed on each copper plate 14, and another copper plate 18 was placed on each heater 16. A hole 20 having a diameter of 5 mm was bored through the laminate of the copper plates 14, 18 and the plate heater 16 on each side of the film sample 10 such that the two holes 20 were in axial alignment and were directed normal to a central area of the film sample 10. The copper plates 14, 18 were used to rapidly establish thermal equilibrium in the film sample 10 when the heaters 16 were energized. Numeral 22 indicates a thermocouple. A white light source 24 and a CdS photoconductor cell 26 were arranged on the axis of the holes 20. For each film sample 10, light transmittance was measured while the temperature was gradually raised and then gradually lowered.

Figure 2:
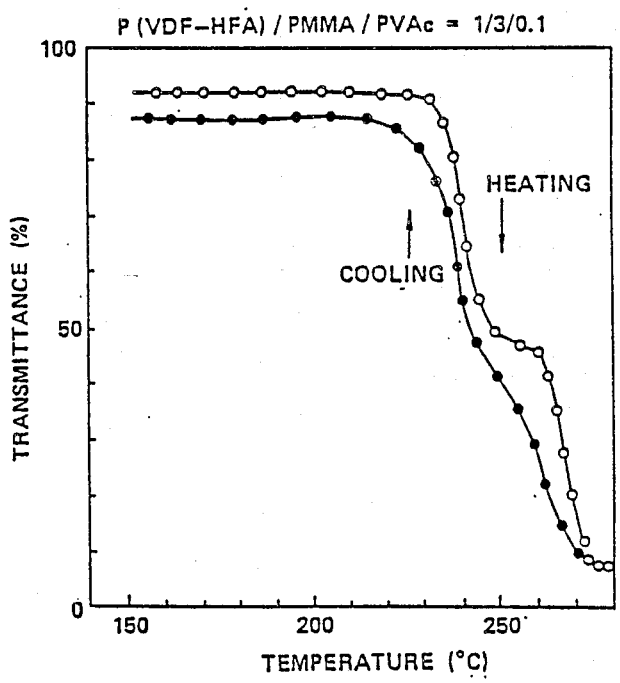
FIGS. 2, 3 and 6 are graphs showing the relationships between temperature and light transmittance in three examples of multicomponent resin compositions according to the invention, respectively.
Figure 3:
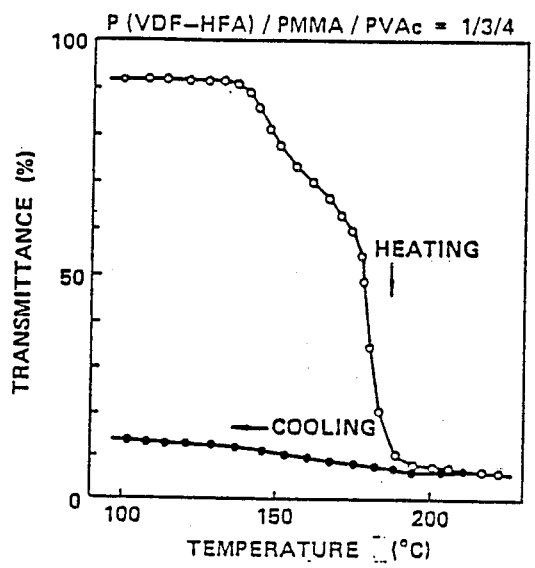

FIG. 2 shows the result of the transmittance measurement on the film of the 1:3:0.1 blend of P(VDF-HFA)/PMMA/PVAc. Initially the film was colorless and transparent. The transmittance sharply lowered as the temperature was raised beyond about 230° C., and soon the film assumed a blue color. As the temperature was further raised the blue color changed to a white color. When the whitened film was cooled the film underwent an almost reverse change from white color to blue color and then to colorless transparency. However, such reversibility of the color changes was not observed on the films of the blends containing relatively large amounts of PVAc. For example, FIG. 3 shows the result of the transmittance measurement on the film of the 1:3:4 blend of P(VDF-HFA)/PMMA/PVAc. In this case the film retained a white color when once heated up to about 200° C. and then cooled. When the heating was terminated at about 150° C. and the film was cooled from that temperature, the film remained blue.

Figure 4:
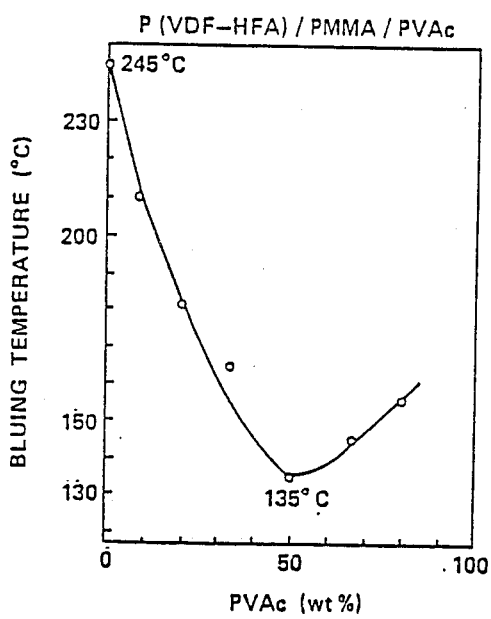
FIG. 4 is a graph showing the relationship between the amount of a vinyl ester polymer in an example of resin compositions according to the invention and the temperature at which coloring of the resin composition begins.

By heating the tested seven kinds of samples blued at different temperatures as shown in FIG. 4, wherein the bluing temperature is plotted versus the weight percentage of PVAc in each blend of P(VDF-HFA), PMMA and PVAc. In every blend the weight ratio of P(VDF-HFA) to PMMA was 1:3 as mentioned hereinbefore. The graph of FIG. 4 indicates that the bluing temperature, or the temperature at which a thermally induced color change begins, depends significantly on the amount of the third component (PVAc in this example) in a blended resin composition according to the invention and, therefore, can be desirably preset within a fairly wide range such as from 135° C. to 245° C.

REFERENCE 1

Figure 5:
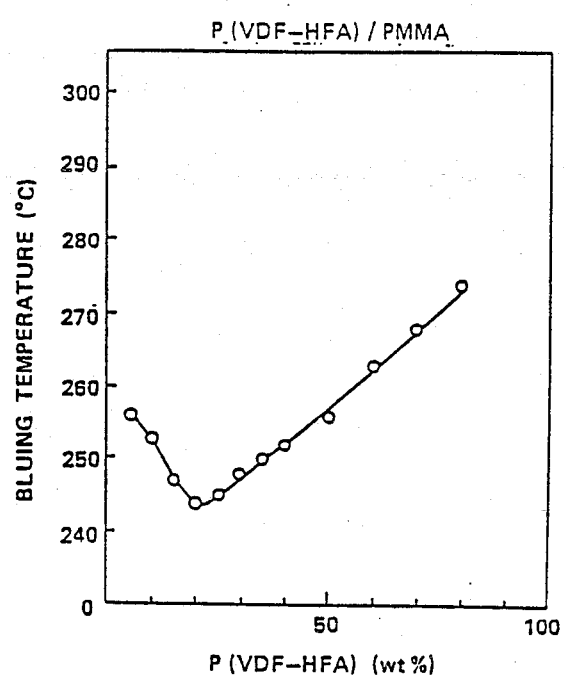
FIG. 5 is a graph showing the relationship between the blending ratio of a two-component resin composition not in accordance with the invention and the temperature at which coloring of the resin composition begins.

The VDF-HFA copolymer (91:9 by mol) used in Example 1 was blended with PMMA in various proportions in methyl ethyl ketone, and each blend was formed into a cast-film by the same method as in Example 1. That is, these blends did not contain PVAc or any other "third" component. Initially the films of these blends were colorless and transparent, and heating caused the films to undergo lowering of light transmittance and to assume blue color at different temperatures depending on the blending proportion. FIG. 5 shows the relationship between the amount of P(VDF-HFA) in the blend and the bluing temperature. As can be seen in FIG. 5, in every blending proportion the bluing temperature or the transition temperature in regard of light transmittance was higher than about 245° C. Furthermore, every blend was very rapid in its transition from a phase-separated state to a mutually soluble state and exhibited thermal reversibility of such transition. Therefore, it was impossible to fix the blue or white color of these blends.

EXAMPLE 2

PMMA and a copolymer of 54 mol% of VDF and 46 mol% of trifluoroethylene (TFE) were used as the first and second components, and PVAc as the third component. Blending of these three components was performed in the same manner as in Example 1 to obtain blend samples different in the blending proportions. Each blend sample was formed into a cast-film having a thickness of about 100 μm, and the film was subected to the measurement of light transmittance under the heating and cooling conditions as described in Example 1.

Figure 6:
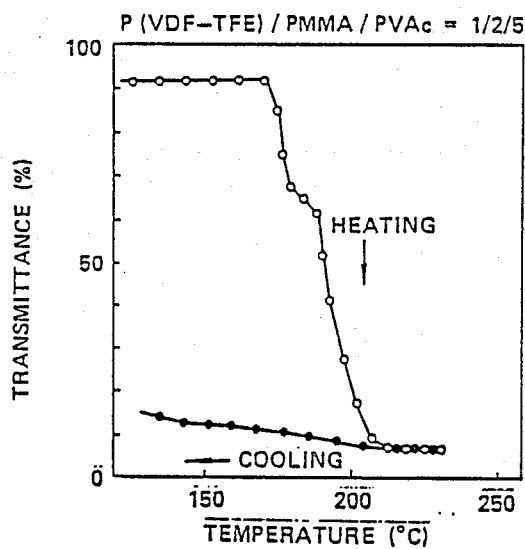

FIG. 6 shows the result of the transmittance measurement on the film of the 1:2:5 (by weight) blend of P(VDF-TFE)/PMMA/PVAc. Initially the film was colorless and transparent. When heated the film blued and then whitened. When cooled the color changes were irreversible. As will be understood from a close resemblance between the curves in FIG. 6 and the curves in FIG. 3, it was possible to fix the color of the P(VDF-TFE)/PMMA/PVAc films in blue or in white by suitably setting the heating temperature according to the blending proportions.

Similar results were obtained also when polyvinyl propionate was used in place of PVAc.

EXAMPLE 3

The VDF-HFA copolymer (91:9 by mol) used in Example 1 and polyethyl acrylate were employed as the first and second components, and PVAc as the third component. These three components were blended in various proportions and each blend was formed into a cast-film by the same process as in Example 1. The obtained films were colorless and transparent. The measurement of light transmittance by the method described in Example 1 revealed that the blend samples prepared in Example 3 were analogous to the blends of Example 1 in the manner of temperature dependence of transmittance and also in the tendency to color changes. It was possible to fix the color of the blend samples in blue or in white by correlatively adjusting the blending proportions and the heating temperature.

EXAMPLE 4

Polymethyl vinyl ether (PMVE) and polystyrene (PSt) were chosen as the first and second components. A blend of PMVE with PSt has mutual solubility and exhibits a LCST-type phase diagram. As the third component, a copolymer of 30 mol% of acrylonitrile (AN) with 70 mol% of styrene (St) was employed.

First these three kinds of polymers were dissolved together in tetrahydrofuran in predetermined proportions, and the resultant solution was well stirred. The tested PMVE:PSt:V(AN-St) proportions were 1:1:0 and 1:1:1 by weight. From each of the two kinds of mixed solutions a cast-film having a thickness of about 100 μm was formed by a solution coating method using a glass substrate. The obtained films were colorless and transparent. The measurement of light transmittance by the method described in Example 1 revealed that the effects of heating and cooling on the transmittance and color of the PMVE/PSt/P(AN-St) blends were resembling to the effects observed in Example 1. When heated the blend samples blued and then whitened, and the color changes were irreversible by cooling. It was possible to desirably preset the temperature at which the bluing color change begins within the range from about 110° C. to about 150° C. by controlling the amount of the AN-St copolymer in the blended resin composition. Also it was possible to fix the color of the blended resin composition in blue or in white by suitably setting the heating temperature.

What is claimed is:

1. A blended multicomponent resin composition, comprising
   a combination of first and second polymers wherein said combination of first and second polymers is selected from the group consisting of combinations of a polyalkyl methacrylate and chlorinated polyethylene, combinations of a polyalkyl acrylate and a vinylidene fluoride base copolymer, combinations of a polyalkyl methacrylate and a vinylidene fluoride base copolymer, combinations of polyvinyl methyl ketone and a vinylidene fluoride base copolymer, combinations of polystryene and a polyalkyl vinyl ether, combinations of polycarbonate and polycaprolactone, combinations of an ethylenevinyl acetate copolymer and a chlorinated rubber and combinations of a polyalkyl acrylate and polyvinyl nitrate which have mutual solubility and a blend of lower critical solution temperature appears; and
   a third polymer which has mutual solubility, at least partially, with at least one of said first and second polymers, said third polymer serves the function of controlling the phase separation temperature of the multicomponent resin composition.

2. A resin composition according to claim 1, wherein said polyalkyl acrylate is selected from the group consisting of homopolymers and copolymers of methyl acrylate, ethyl acrylate, n-propyl acrylate, isopropyl acrylate, n-butyl acrylate, isobutyl acrylate, t-butyl acrylate, n-amyl acrylate, n-hexyl acrylate, n-peptyl acrylate, n-octyl acrylate, n-nonyl acrylate, n-decyl acrylate, n-dodecyl acrylate, n-tetradecyl acrylate, n-hexadecyl acrylate, n-stearyl acrylate and hydroxyethyl acrylate,
   said polyalkyl methacrylate being selected from the group consisting of homopolymers and copolymers of methyl methacrylate, ethyl methacrylate, n-propyl methacrylate, isopropyl methacrylate, n-butyl methacrylate, isobutyl methacrylate, t-butyl methacrylate, n-amyl methacrylate, n-hexyl methacrylate, n-peptyl methacrylate, n-octyl methacrylate, n-nonyl methacrylate, n-decyl methacrylate, n-dodecyl methacrylate, n-tetradecyl methacrylate, n-hexadecyl methacrylate, n-stearyl methacrylate and hydroxyethyl methacrylate.

3. A resin composition according to claim 1, wherein said vinylidene fluoride base copolymer is selected from the group consisting of copolymers of vinylidene fluoride and trifluoroethylene, copolymers of vinylidene fluoride and tetrafluoroethylene, copolymers of vinylidene fluoride and hexafluoroisobutene, copolymers of vinylidene fluoride and hexafluoroacetone, copolymers of vinylidene fluoride and chlorotrifluoroethylene, copolymers of vinylidene fluoride and vinyl fluoride, copolymers of vinylidene fluoride and hexafluoropropene and copolymers of vinylidene fluoride, trifluoroethylene and vinyl fluoride.

4. A resin composition according to claim 1, wherein said third polymer is a polymer of a vinyl ester.

5. A resin composition according to claim 4, wherein said vinyl ester is selected from the group consisting of vinyl acetate, vinyl propionate, vinyl butyrate, vinyl caproate, vinyl caprylate, vinyl caprate, vinyl laurate, vinyl stearate and vinyl benzoate.

6. A resin composition according to claim 1, wherein said third polymer is polystyrene.

7. A resin composition according to claim 1, wherein said third polymer is a copolymer of styrene and acrylonitrile.

8. A resin composition according to claim 1, wherein said third polymer amounts to from 0.1 to 90% by weight of the resin composition.

9. A resin composition according to claim 8, wherein said third polymer amounts to from 1 to 80% by weight of the resin composition.

10. A resin composition accordin9 to claim 1, wherein said combination is a combination of polyethyl acrylate and a copolymer of vinylidene fluoride and hexafluoroacetone, and said third polymer is polyvinyl acetate.

11. A resin composition according to claim 1, wherein said combination is a combination of methyl methacrylate and a copolymer of vinylidene fluoride and trifluoroethylene, and said third polymer is a polyvinyl ester selected from the group consisting of polyvinyl acetate and polyvinyl propionate.

12. A resin composition according to claim 1, wherein said combination is a combination of polystyrene and polymethyl vinyl ether, and said third polymer is a copolymer of styrene and acrylonitrile.

13. A resin composition comprising:
   a combination of first and second polymers which have mutual solubility and a blend of which exhibits a phase diagram in which a a lower critical solution temperature appears, wherein said combination is a combination of polymethyl methacrylate and a co-polymer of vinylidene fluoride and hexafluoroacetone; nad
   a third polymer which has mutual solubility, at least partially, with at least one of said first and second polymers, said third polymer being polyvinyl acetate in an amount to function controlling the phase separation temperature of the multicomponent resin composition.

* * * * *